United States Patent
Edwards et al.

(10) Patent No.: US 10,475,291 B1
(45) Date of Patent: Nov. 12, 2019

(54) SYSTEM, APPARATUS AND METHOD FOR DRAWING-BASED LOTTERY PLAY WITH WAGERING EVENT INTEGRITY

(71) Applicant: IGT Global Solutions Corporation, Providence, RI (US)

(72) Inventors: Corey Edwards, Providence, RI (US); Bradford Heathcote, Chepachet, RI (US); Aaron Michael Koll, Lincoln, CA (US); Sarah W. Simpkins, Warwick, RI (US)

(73) Assignee: IGT Global Solutions Corporation, Providence, RI (US)

( * ) Notice: Subject to any disclaimer, the term of this patent is extended or adjusted under 35 U.S.C. 154(b) by 161 days.

(21) Appl. No.: 15/828,612

(22) Filed: Dec. 1, 2017

(51) Int. Cl.
  *G07F 17/32* (2006.01)
  *G07C 15/00* (2006.01)
  *G07F 17/42* (2006.01)

(52) U.S. Cl.
  CPC ......... *G07F 17/329* (2013.01); *G07C 15/005* (2013.01); *G07F 17/3241* (2013.01); *G07F 17/42* (2013.01)

(58) Field of Classification Search
  CPC .... G07F 17/329; G07F 17/3241; G07F 17/42; G07C 15/005
  USPC .......................................................... 463/17
  See application file for complete search history.

(56) References Cited

U.S. PATENT DOCUMENTS

| | | | |
|---|---|---|---|
| 5,317,135 A * | 5/1994 | Finocchio | G06Q 50/34 235/375 |
| 7,627,497 B2 | 12/2009 | Szrek et al. | |
| 10,275,980 B1 * | 4/2019 | Heathcote | G07F 17/3227 |
| 2003/0114213 A1 * | 6/2003 | Bennett, III | G07F 17/32 463/17 |
| 2004/0023711 A1 * | 2/2004 | Knapp | A63F 3/0665 463/17 |
| 2004/0193464 A1 * | 9/2004 | Szrek | G06Q 20/202 705/24 |
| 2005/0194741 A1 | 9/2005 | Kowell | |
| 2009/0101714 A1 | 4/2009 | Weyler, III et al. | |
| 2009/0227320 A1 | 9/2009 | McBride | |
| 2010/0181755 A1 * | 7/2010 | Irwin, Jr. | A63F 3/069 283/100 |
| 2011/0034230 A1 * | 2/2011 | Guziel | A63F 3/0645 463/17 |
| 2011/0165933 A1 * | 7/2011 | Guziel | A63F 3/0645 463/17 |

(Continued)

FOREIGN PATENT DOCUMENTS

WO  WO/2001/03785  1/2001

*Primary Examiner* — Jay Trent Liddle
*Assistant Examiner* — Ryan Hsu
(74) *Attorney, Agent, or Firm* — Neal, Gerber & Eisenberg LLP

(57) ABSTRACT

A lottery host, ticket generator, retailer terminal(s) and specially adapted draw-based lottery game tickets provide embodiments of a wagering event integrity control system, method and apparatus as disclosed. In various embodiments, purchased but unactivated tickets for a lottery drawing are activated based upon key codes associated with unsold tickets received by the lottery host at the end of a game. The lottery host and ticket generator can store different sets of information about the draw-based lottery game tickets, which can be pre-printed with game indicia and activated when desired by the player.

20 Claims, 6 Drawing Sheets

(56) References Cited

U.S. PATENT DOCUMENTS

2016/0093137 A1* 3/2016 Gaddy ................. G07F 17/329
　　　　　　　　　　　　　　　　　　　283/94
2016/0210808 A1　 7/2016 Giunti
2016/0346672 A1　12/2016 Maupas-Oudinot et al.

* cited by examiner

SYSTEM, APPARATUS AND METHOD FOR DRAWING-BASED LOTTERY PLAY WITH WAGERING EVENT INTEGRITY

BACKGROUND

The present disclosure relates generally to lottery systems, and more particularly to embodiments of a system, method and apparatus for drawing-based games.

Lottery games that are determined by pre-printed indicia and random drawings are known. For example, instant lottery tickets typically provide a scratch-off coating whereby a user can scratch off the coating to determine if the underlying indicia result in any winnings. When instant tickets are made available for sale, they are generally provided to a retailer in packs, and an activation code or number can be read by, or entered through, a terminal to activate the pack of tickets for sale and play. Once the pack is activated, the individual tickets in the pack can be sold without requiring any further activation for the tickets to be played and redeemed. When a ticket purchaser seeks to redeem a purchased instant ticket, a validation code, such as a void-if-removed number ("VIRN"), can be scanned at a retailer POS terminal or other terminal to confirm that the ticket is a winner, and the scanned code is communicated to a lottery host, which checks the code against a database of stored ticket information and returns a message to the retailer terminal that the code is valid to allow the retailer to redeem the ticket for its associated winnings. The VIRN code is typically covered by latex for security purposes.

Online or draw-based games, including raffle games, allow a user to select various indicia such as numbers, letters or symbols, for example, or have the indicia randomly selected for the user, and then a random drawing determines if the user's indicia match enough of the randomly drawn indicia for the user to win. With draw-based games, special drawing game devices or terminals separate from standard retailer point-of-sale (POS) terminals are generally employed to process wagers and print tickets and/or receipts with the player's requested or randomly selected indicia. These special devices may be positioned away from traditional checkout lines and POS terminals, such that players who may be shopping for other items must make a second stop at the special device to make a wager for a draw-based game. Regardless, the special terminal communicates the wager and associated details to a host as part of registering the wager. The game's integrity is maintained, at least in part, by ensuring that only purchased tickets with registered wagers are capable of winning when the random drawing occurs.

Draw-based lottery tickets with pre-printed game indicia are not common, but as with traditional draw-based lottery tickets, the operator of the lottery must know the indicia or set of indicia tied to tickets that were actually purchased in order to register those tickets as eligible to win. If not all of the pre-printed tickets have been sold or activated, then any unsold or unactivated tickets must not be included in determining winners in order to maintain the integrity of the wagering game. While a pack of pre-printed draw-based lottery tickets can be activated for sale, such activation cannot be treated as an instant ticket pack activation would be, where each individual ticket is thereafter redeemable by scanning a validation code, since unscrupulous individuals may seek out unpurchased, but winning, draw-based tickets after a drawing has occurred. Accordingly, draw-based lottery tickets with pre-printed indicia must be purchased, and the purchase recorded before the drawing, in order for the ticket to be activated for play and later redemption.

While a code can be provided on a pre-printed draw-based ticket for scanning in order to activate and/or register the ticket for play, problems arise if the activation for play code is not scanned or otherwise entered and communicated to the host. For example, if a purchaser buys a pre-printed draw-based ticket and forgets to activate it, or if a purchaser buys a group of tickets and only some of the group are activated, then any unactivated ticket may include winning indicia but not be redeemable, since it would be treated by the system as an unsold ticket. Because games can be terminated for various reasons, if a purchased ticket is not activated prior to the last drawing for a given game, the purchaser may feel as if no value was obtained for the purchase. There is thus a technical challenge with pre-printed draw-based lottery tickets to ensure that all purchased tickets are activated for play prior to the game's termination, even when the ticket code has not been scanned or otherwise communicated to the host. This challenge is heightened by the desire to reduce the equipment footprint of lottery machines in retailer sites such that all required operations can be fulfilled using a variety of devices, including personal communications devices.

A further challenge exists with pre-printed draw based ticket games where the tickets can have different values even before entry into the drawing. For example, it can be desirable to provide draw-based ticket games with pre-printed game indicia, where the recurrence of a single number or other indicia on the ticket provides the player with a chance to win greater amounts in the drawing. With pre-printed tickets having a variable expected return, an unscrupulous individual may try to learn what indicia are printed on unsold tickets to evaluate which tickets are more valuable prior to purchasing the tickets. While the pre-printed indicia can be provided under a latex or other scratch-off coating, an unscrupulous person with access to the database of stored ticket information may be able to read the ticket identification code, such as a game-pack-ticket number on the face of the ticket, access the system database to determine the playing indicia on the ticket, and then determine whether the ticket is more valuable than other tickets without purchasing the ticket or making it unsellable in any way. Thus, there is a technical challenge in providing pre-printed draw based ticket games with variable expected returns in that the system must ensure that it is not possible to look up in any system the details of what is printed on the ticket without having physically scratched off the latex covering, which would render the ticket void.

BRIEF SUMMARY

The present disclosure relates generally to a system, apparatus and method for drawing-based lottery game play wherein wagering event integrity is controlled using, for example, one or more of a remote lottery host, a remote ticket generator system, retailer terminal(s) and specially adapted tickets and ticket groups. In various embodiments, game indicia for the drawing lottery game is pre-printed on each ticket, with each ticket providing an opportunity for a variable expected return.

According to the present disclosure, pre-printed combination or hybrid instant/draw-based lottery tickets are provided in a pack and/or sequence. Each ticket in the pack includes a unique activation code which, when read or entered at one of various devices, activates the draw-based game portion of each individual ticket for play. A lottery host in communication with one or more retailer terminals receives a signal from the device that read the code, wherein the signal corresponds to the unique activation code. The host compares the code, or a converted version of the code, with a previously stored code associated with the ticket, and if the comparison matches, the drawing-based game ticket is activated. Other intermediate steps in the activation process may be involved. For winning tickets, the host can similarly compare a received signal related to a scanned validation code to verify that the ticket is a winner. In various embodiments, the lottery host knows a key code which is associated with the game indicia on the ticket, and is further derivable from a key code link printed on the ticket that is contained within the validation code. However, the lottery host cannot associate either the key code or the game indicia with the ticket identifier on the ticket.

Further according to the present disclosure, upon a game being terminated and any unsold tickets being returned to the lottery host, any sold but unactivated tickets can be determined and activated for a final draw. Details about such unactivated tickets are unknown to the host until the ticket generator system informs the host of the key codes for the unsold tickets, which the host can use to activate the remaining sold but previously unactivated tickets, if any. In this way, unscrupulous individuals are not able to benefit from accessing a system with game-pack-ticket numbers to learn what playing indicia is associated with which unactivated tickets.

BRIEF DESCRIPTION OF THE SEVERAL VIEWS OF THE DRAWINGS

FIG. 3 illustrates an exemplary game ticket pack according to certain embodiments of the present disclosure.

DETAILED DESCRIPTION

Figure 1:
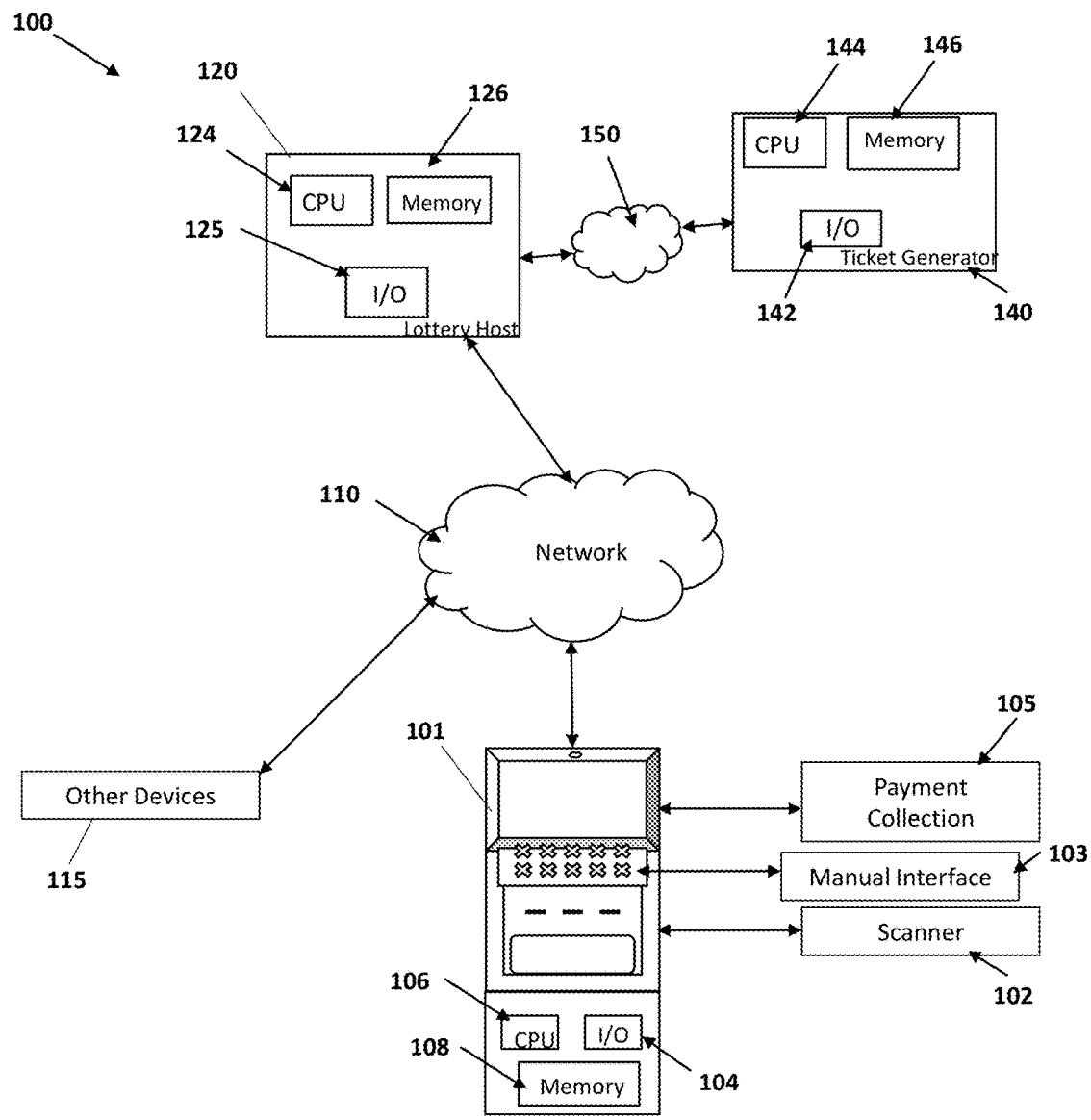
FIG. 1 is a schematic illustrating an exemplary system according to certain embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein, but is applicable to any system, method and/or apparatus wherein an event provider, operator, retailer and/or player experiences improved event integrity through, in part, employing safeguards to ensure that non-activated products that should be activated and/or tracked are appropriately triggered. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as those disclosed herein can be used to support regulated state or governmental lotteries, private gaming corporations, or other entities that provide legal gaming to customers. While the examples are described principally with reference to regulated state lotteries, it will be appreciated that the same solutions may be applied in other wagering or regulated gaming applications. The example embodiments described below include references to a lottery host or a host system. A host or host system may be implemented as a single computing system or as a collection of computing systems or subsystems which are communicatively coupled, and each component or subsystem of the exemplary host can be implemented in hardware, software or a combination thereof.

According to various embodiments, the present disclosure describes a wagering event integrity control system, device and method which can enable wagering event providers, operators and associated retailers to offer a securely integrated, ticket-based wagering event to wagering event consumers. In various embodiments, the ticket-based wagering event can relate to a game that includes a first game, such as an instant win game, combined with a subsequent event-based game, such as a drawing-based game. In various other embodiments, the ticket-based wagering event relates to a draw-based game. In still further embodiments, the apparatus, system and method relates to a draw-based wagering game with a variable expected return to player. The expected return to player is the percentage of wagered money that will be paid back out to players in the form of prizes in the long run. Return to player is one way to mathematically ascribe a value to a wager. A game with a variable expected return to player is one in which some wagers for that game will have different return to player values than other equivalently placed wagers for that same game. This situation might occur when the wagers' respective playing indicia varies in some fashion which then changes the expected return to player, such as, for example, through changing the odds of a win or by changing the prize value in some fashion.

FIG. 1 illustrates an exemplary system 100 according to various embodiments of the present disclosure. In various embodiments, system 100 includes one or more retailer terminals (e.g., terminal 101) incorporating and/or in communication with a scanner device 102. Each retailer terminal 101 can be configured to communicate and receive activation and validation codes associated with certain product inventory using, among other things, the scanner 102, or a manual input interface 103 (e.g., a key pad, mouse, trackball, touch pad, microphone, joystick, game pad, voice recognition device, toggle switch, pushbutton, gesture based motion detection device or the like visual interface and/or touch screen interface in retailer terminal 101). According to various aspects, the retailer terminal 101 can have or be in communication with a payment collection apparatus 105, a display 107 and a ticket dispenser tray. The payment collection apparatus 105 can process cash, credit, debit, cashless, ticket-based, loyalty reward/redemption and other forms of payment, for example. Such apparatus 105 can be provided in the form of one or more bill collectors, coin collectors, magnetic stripe readers, chip readers, RFID tag readers and other known devices for receiving and processing payments.

While the retailer terminal 101 can be embodied in a clerk-operated point-of-sale (POS) terminal, other forms of devices 115 with or without all of the components of the retailer terminal 101 may be employed in connection with various aspects of the present disclosure. For example, a player self-service terminal, win checker device or other computing device may be employed as a device 115 in appropriate commercial sites, subject to any jurisdictional limitations, for example. Further, a player's personal communications device or personal computer can be employed as a device 115. It will be appreciated that the terminal(s) 101 and any device 115 can incorporate necessary processing power in the form of one or more central processing units (CPU) 106, an input/output (I/O) interface 104 and memory 108 for storing data and programming that can be employed by the processor to carry out the functions and communications necessary to facilitate the processes and functionalities described herein. In addition to display devices, the terminal 101 and/or device 115 can also include other peripheral output devices, such as one or more printers, for example, which may be connected through an output peripheral interface.

Each retailer terminal 101 and device 115 can also be in communication with a network 110 (e.g., the internet or a private network). The system 100 can also include a remote central controller or lottery host 120. The host 120 is shown in communication with the network 110, and is thereby in operative communication with retailer terminal 101 and device 115. It will be appreciated that the host 120 can incorporate necessary processing power in the form of one or more central processing units (CPU) 124, an input/output (I/O) interface 125 and memory 126 for storing data and programming that can be employed by the processor to carry out the functions and communications necessary to facilitate the processes and functionalities described herein. It should be understood that, in various embodiments, there may be one or more retailer terminals 101 and/or one or more remote lottery hosts 120, as appropriate.

As further shown in FIG. 1, the system 100 can also include a ticket generator system 140. The ticket generator system 140 is shown in communication with network 150, which is in communication with host 120 but not in communication with terminal 101. It will be appreciated that the ticket generator system 140 can incorporate necessary processing power in the form of one or more central processing units (CPU) 144, an input/output (I/O) interface 146 and memory 142 for storing data and programming that can be employed by the processor to carry out the functions and communications necessary to facilitate the processes and functionalities described herein. It should be understood that, in various embodiments, there may be one or more ticket generator systems 140, as appropriate.

Each ticket for a given game can be printed by the ticket generator, for example, with game indicia, activation indicia, validation indicia, artwork, instructions, opaque material, clear material, removable material (e.g., scratch-off material such as latex) and other desired elements. Content, data, design elements and other items to be printed on the substrate can be generated by the ticket generator system 140 operating programmed instructions stored in a memory. In various embodiments, the data for multiple games are printed on a given individual substrate. The substrate from which tickets are produced can be perforated or scored by the ticket generator system in order to permit individual game tickets to be removed from the pack, roll or sheet of tickets.

Figure 2:
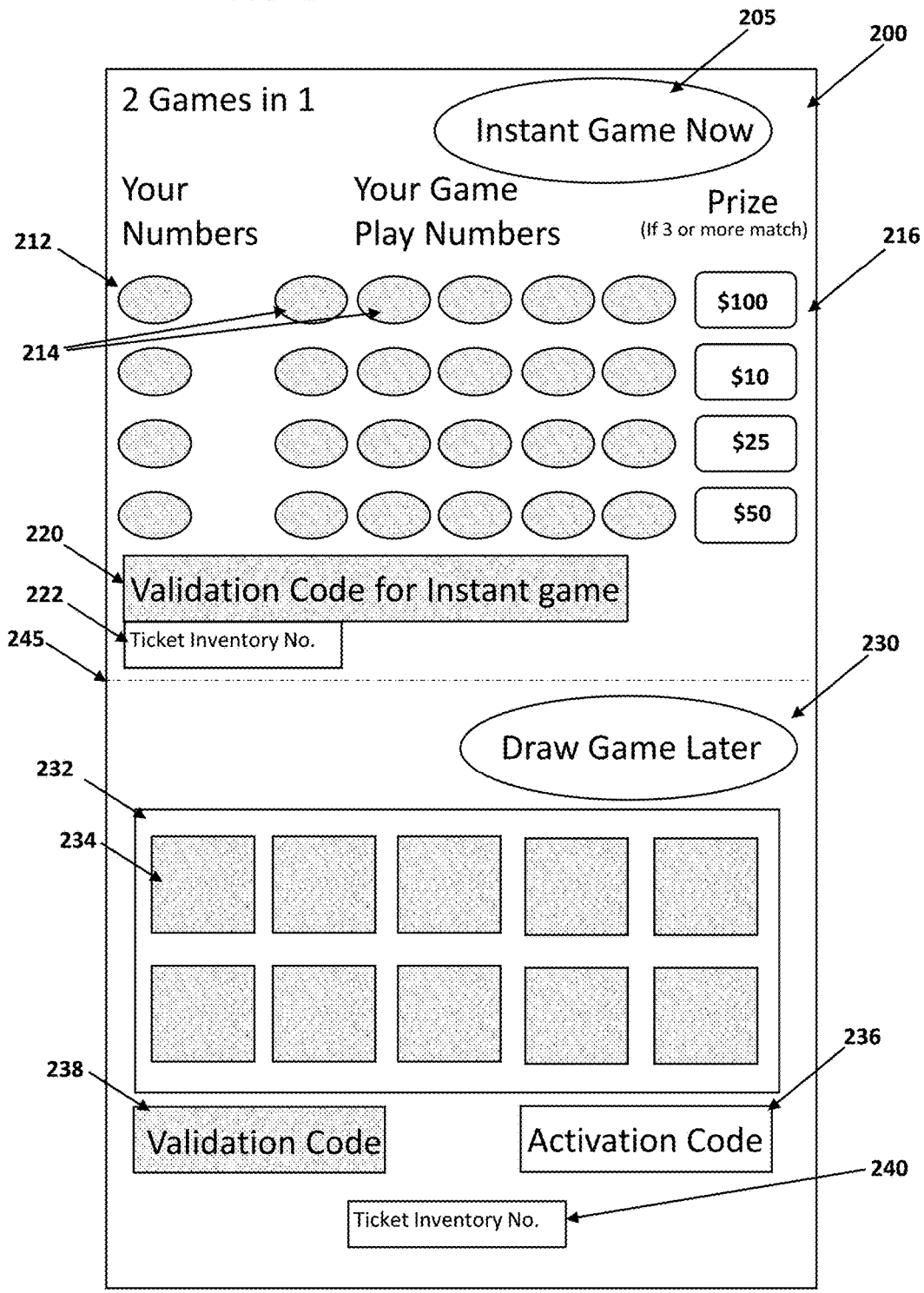
FIGS. 2 and 3 illustrate an exemplary ticket according to certain embodiments of the present disclosure.
Figure 3:
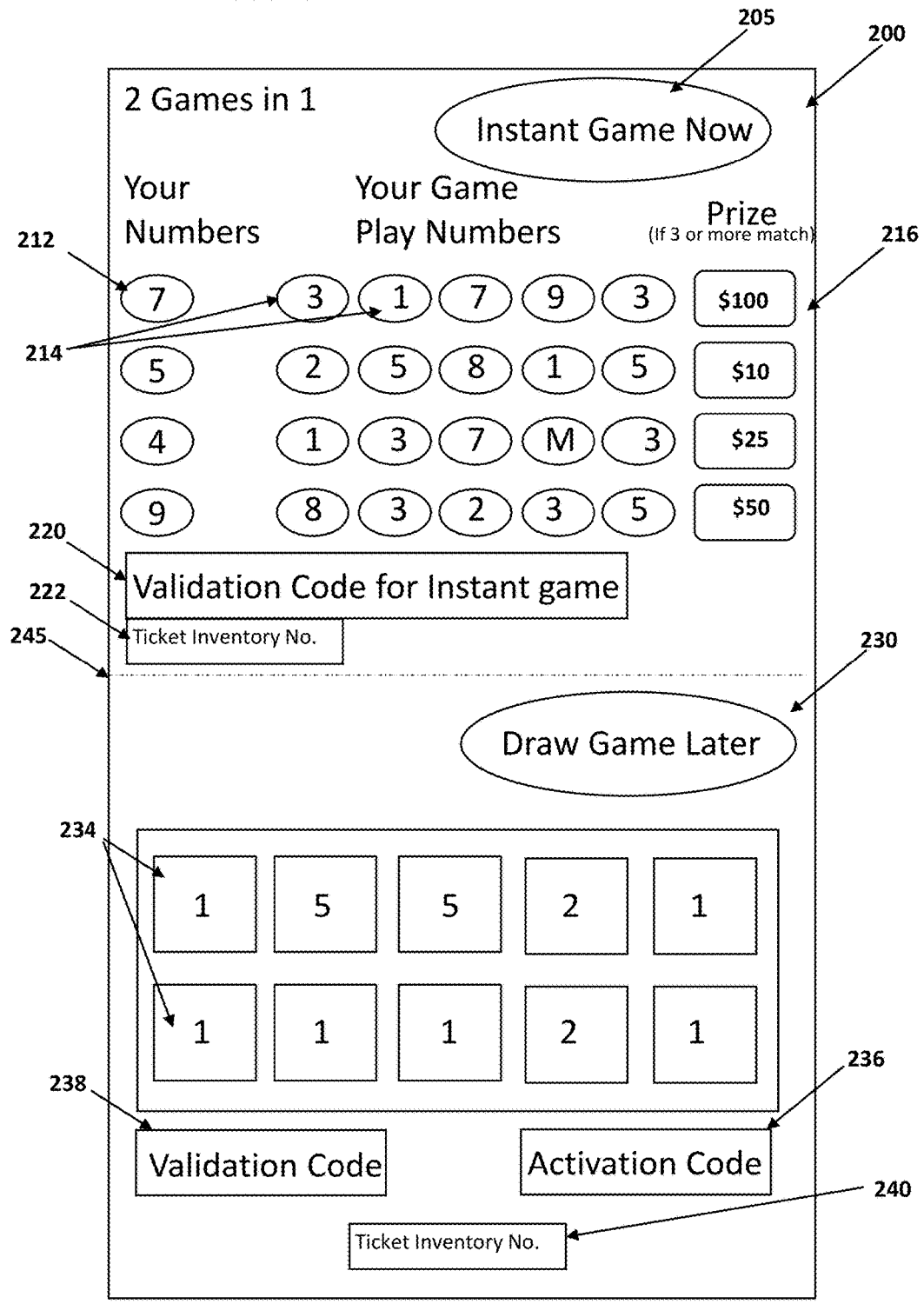

Ticket generator system 140 can print tickets for use as presently disclosed. For instance, as shown in FIGS. 2 and 3, a combination, or hybrid, instant-plus-draw lottery ticket 200 is shown, with FIG. 2 showing a ticket 200 with portions covered in removable material and FIG. 3 showing the ticket 200 after the removable material has been removed. The instant game portion 205 of the ticket 200 shows game play indicia including "Your Numbers" 212 and "Your Game Play Numbers" 214, along with a prize section 216. In such an embodiment, the instant game may be played, for example, by scratching the removable material off of the indicia 212, 214 to determine how many indicia in a row of "Your Game Play Numbers" match the indicia in the corresponding row of the "Your Numbers" section. As shown on the exemplary ticket 200, if three or more indicia match the "Your Numbers" indicia, then the instant portion 205 of the ticket is a winner. While "Numbers" are referenced above and in the drawings, it will be appreciated that "Numbers" can refer to letters, symbols or any other form of indicia permitting operation of the apparatus, system and method disclosed herein. As further shown in FIG. 2, a validation code 220 and a ticket inventory number 222 are also printed on the ticket 200. The ticket inventory number 222 can include a game code, pack code and ticket code, in various embodiments. For example, if a game called "Big Money" is game number "01", the pack associated with ticket 200 is pack "0234" and the ticket is ticket number "0099" produced in that pack, the ticket inventory number 222 would read "0102340099". The validation code 220 can be presented as an external VIRN that may be combined with other representative code elements, such as the ticket inventory number, a checksum number for security purposes and a routing number, for example. In various embodiments, the validation code 220 is printed in the form of a barcode that can be read by a scanner of a retailer terminal 101 or a camera of a personal communications device 115.

The draw-based section 230 of the ticket 200 in FIG. 2 is shown with a play area 232 and draw game indicia 234 covered by removable material. The draw-based section 230 is further shown with an activation code 236, a validation code 238 and a ticket inventory number 240. In various embodiments, the ticket inventory number 240 for the draw-based game is the same as the ticket inventory number 222 for the instant game on ticket 200. As it cannot be known when the tickets will be purchased or activated, no draw date is initially assigned to any of the tickets. The activation code 236 can include an external VIRN that may be combined with other representative code elements, such as the ticket inventory number, a checksum number for security purposes and a routing number, for example, and can be printed in the form of a barcode that can be read by a scanner of a retailer terminal 101 or a camera of a personal communications device 115. The validation code 238 can include an external VIRN and a validation PIN code that may be combined with other representative code elements, such as the ticket inventory number, a checksum number for security purposes and a routing number, for example, and can be printed in the form of a barcode that can be read by a scanner of a retailer terminal 101 or a camera of a personal communications device 115. In some embodiments, the activation code and the validation code can be presented as a single code on the ticket, as long as the single code includes the external VIRN and validation PIN. In various embodiments, a removable coating is printed atop the validation code and the activation code. In various other embodiments, a removable coating is printed atop the validation code only. In the embodiments where the activation code and the validation code are provided as a single code, a removable coating is printed atop the single code. The removable coating provides a level of security for the ticket to assist in maintaining the integrity of the game, as an unscrupulous individual who knows the external VIRN and validation PIN code for the draw-based game may be able to decipher the indicia 234 and determine, without purchasing the ticket, whether the ticket may have the potential for a large win.

In generating the tickets, the ticket generator system 140 also generates a record for each ticket and produces one or more electronic files containing such records for delivery to the lottery host 120. For example, the ticket generator system 140 may produce a ticket inventory file, which includes the game-pack-ticket number for every ticket delivered to the lottery host 120 for distribution. The ticket generator system 140 may also produce a private file, which includes a record for each ticket, wherein the record can constitute a key code (e.g., ticket internal VIRN number), a validation PIN code and ticket game indicia information for each ticket delivered to the lottery host 120 for distribution. In various embodiments, the key code (e.g., ticket internal VIRN number), validation PIN code and game indicia are unique for each ticket. In various other embodiments, the game indicia may potentially be duplicated from one ticket to another, and each validation PIN code may not necessarily be unique. The private file may also include a computer program or algorithm for converting an inputted key code link, such as an external VIRN number scanned or read from a physical ticket to a key code such as a corresponding internal VIRN number for host processing, as described in more detail elsewhere herein. The information in the ticket inventory file is not mixed with the information in the private file, as such a combination of information would permit anyone with knowledge of the game-pack-ticket number (e.g., ticket inventory number 240) from a ticket with the ability to learn the game indicia 234 on the ticket. Further, the private file does not store the key code link (e.g., the external VIRN number that appears on the ticket), as this would provide anyone with knowledge of the external VIRN and access to the private file with the ability to learn the game indicia 234 on the ticket. Additionally, the validation code, and optionally the activation code, is/are provided under a removable coating such that an unscrupulous person who may have access to the private file and the algorithm for converting external VIRNs to internal VIRNs cannot take the external VIRN from an unsold ticket, run the algorithm against the external VIRN, learn the internal VIRN and then access the private file to learn the game indicia 234 on the ticket.

Once the tickets and the files are produced, the ticket generator system 140 sends the tickets to the lottery for distribution, and further sends the electronic files to the lottery host 120 for storage. Delivery of the electronic files can proceed in many ways, such as through physical delivery of a storage medium (e.g., flash drive), direct electronic delivery or electronic delivery through an intermediary system, such as a secure site requiring authentication from the host before access to the electronic files is granted. The ticket generator system 140 will also generate and store a file of ticket inventory numbers (e.g., game-pack-ticket numbers) and their corresponding key codes (e.g., internal VIRN codes). Once the tickets are ultimately distributed from the lottery to the retailers for individual sale, the ticket generator system 140 knows the tickets were transported to the lottery, but has no knowledge of where any individual ticket may be located. Further, once the tickets are distributed to the retailers, the lottery host knows where the tickets have been delivered, but has no knowledge of what indicia 234 is printed on any individual ticket based on the ticket's identification number.

In various embodiments, ticket inventory deployed to retailers for ultimate consumption by consumers is managed. As will be appreciated, the ticket inventory may include, for example, packs containing multiple individual products arranged in a sequence (e.g., packs or rolls of lottery game tickets to be sold individually to consumers) that are delivered from a ticket generator system 140 to the lottery and then to one or more retailers. In various embodiments, when the tickets are delivered from the ticket generator system to the lottery host, the instant tickets are loaded into an instant ticket management subsystem associated with the host, and the online draw-based tickets are loaded (with the information from the face of the online draw-based tickets) into an online lottery draw game subsystem. It will be appreciated that the instant ticket management subsystem and the online lottery draw game subsystem can both be part of the lottery host 120, can both be separate from the host 120, or may be arranged such that one subsystem is part of the host 120 and one subsystem is not. When a retailer makes certain ticket inventory (e.g., a pack containing one or more tickets for sale to consumers) available for sale to consumers, the retailer can "activate" the pack. Pack "activation" may take many forms, including, for example, communicating to the host (e.g., 120) that the pack is being made available for sale. In various embodiments, a retailer can communicate such availability for sale by, among other things, employing one or more retailer terminals (e.g., 101) and associated hardware and software to scan a pack activation code, or to manually enter a pack activation code. In various embodiments, such codes can be sent directly to the host 120 over network 110 via the retailer terminal(s) 101, and the host 120 can then activate the ticket pack. It will be appreciated that many forms of communication can be accommodated, including email, phone, and other messaging systems and protocols.

In various embodiments, an operator of a retailer terminal(s) 101 employs a scanner device 102 in communication with the terminal 101 to read a game pack number or pack activation code from a ticket pack, whereupon programming operating on the retailer terminal automatically communicates such code or number as a pack activation signal directly to the lottery host 120, which then receives the pack activation signal and subsequently renders the associated pack of tickets as activated for sale and/or eligible for individual ticket activation. In various embodiments, receipt of the activation signal activates the instant tickets so that they may be purchased and played, and further activates the draw-based tickets so that they may be purchased and later activated for a drawing of the owner's choice. In various embodiments, an operator of the retailer terminal can manually enter a pack activation code or number into a user interface in communication with the retailer terminal, and the code or number, or translated representation thereof, is then communicated as the pack activation signal to the lottery host for activation in similar fashion. As noted above, when a ticket pack is "activated for sale", the instant game portion of a ticket within the pack, such as portion 205 of ticket 200 in FIGS. 2 and 3, is now ready to be played and redeemed, whereas the draw-based game of the same ticket (e.g., draw game 230 of ticket 200) is merely ready to be subsequently activated for a drawing of the player's choosing. In various embodiments, the scanned pack activation code or number is first converted by the retailer device into a special indicator that is then communicated as the pack activation signal to the lottery host, which receives the pack activation signal and subsequently renders the associated pack of tickets as activated for sale and/or eligible for individual draw-game activation. When a draw-based game is individually activated later as described herein, it becomes registered for play in the next lottery drawing. In other words, even though the ticket pack is activated for sale, each individual draw-based game ticket is not activated for play until its own activation code or number has been independently scanned, read or otherwise entered and acknowledged by the lottery host 120. Such reading, entering or scanning of the draw-based game activation code (e.g., code 236 in FIGS. 2 and 3) can be performed by a retailer terminal, a ticket checker device, an online portal or by the user's mobile communication device, for example.

Figure 4:
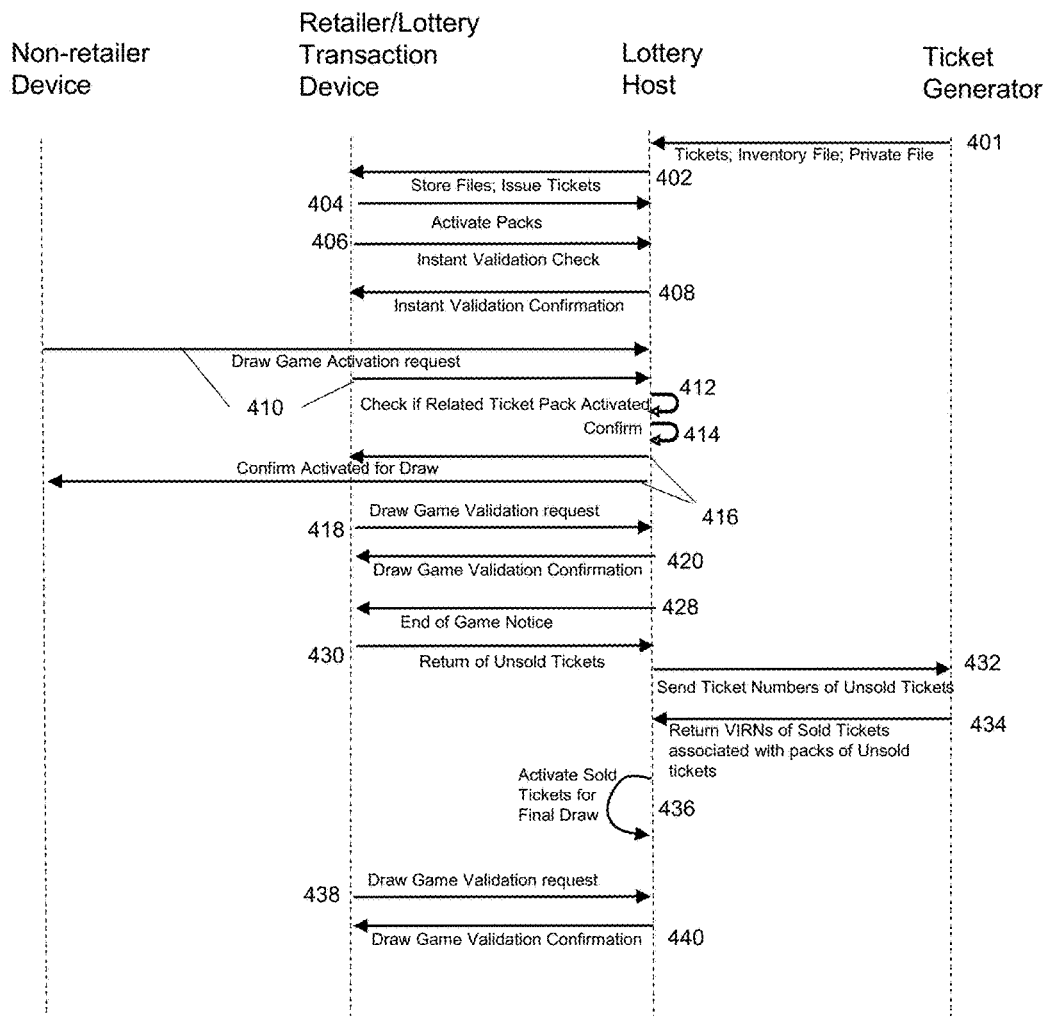
FIG. 4 is a flow diagram illustrating process steps in accordance with embodiments of the present disclosure.

FIG. 4 is a sample process flow illustrating aspects of the present disclosure. As shown therein, and as at step 401, the ticket generator system sends the printed tickets, inventory file and private file to the lottery host. At step 402, the lottery host stores the files, such as by loading the instant tickets into an instant ticket management subsystem and loading the draw-based tickets into an online lottery draw game system, and then distributes the tickets to one or more retailers. At step 404, the retailer activates the pack(s) of tickets in a manner such as described above. As shown in FIGS. 2 and 3 and described above, the tickets can include an instant game portion 205 and a drawing-based game portion 230. In various embodiments, the instant game portion and drawing-based game portion are formed together and are separable by perforation or other physical delineation as shown at 245. The instant game portion can be played at any time after pack activation, and redeemed separately from the drawing-based game portion. For example, a player may play the instant game, determine that the instant game has been won, and then redeem the instant game portion of the ticket for winnings. Redemption of instant game winnings can be handled when the player brings the instant portion of the ticket to a retailer and the instant game validation code (e.g., 220 in FIGS. 2 and 3) is read or scanned by a retailer device as described above. The retailer terminal then sends the instant game validation code to the host at 406, which determines whether the code is associated with a valid and not-yet-redeemed ticket, upon which the host confirms to the retailer that the ticket is valid as at step 408, and winnings can be paid to the player.

As described elsewhere herein, the draw-based portion of the ticket requires individual ticket activation (after pack activation) in order to be activated for a lottery drawing. Such activation can be accomplished by scanning or reading the activation code on the draw-based portion of the ticket, which can be performed by a retailer terminal, a ticket checker device, through a user's communication device or otherwise, and the scanned activation code is then delivered as an activation signal to the host, as shown at step 410 in FIG. 4. It will be appreciated that "reading" a ticket code can be performed by scanning, imaging, reading or manually entering the code using an appropriate interface such as that provided by terminal 101 or another device 115 in FIG. 1. Each ticket is individually activated for the drawing, such that a first ticket has a first activation code, a second ticket has a second activation code and so forth. Upon the ticket activation code being read, a ticket activation signal is sent for that specific ticket to the lottery host in order to activate the ticket. It will be appreciated that such activation can also be performed at the user's desired time ahead of the user's desired drawing. Thus, the purchaser of the ticket need not activate the draw-based game portion of the ticket immediately after purchase, but can wait until a desired drawing date. In this way, a player can wait for a jackpot to reach a certain size, or may gift the ticket to another person to play at the time of their choosing. In various embodiments, as illustrated by step 412, the host first determines if the specific ticket is part of a pack of tickets that has been activated for sale, not stolen, destroyed or otherwise terminated and deemed unactivatable. In such embodiments, this can be performed by querying an instant ticket management subsystem of the host. Since the activation code includes the game-pack-ticket number of the ticket, the host can reference this number when making this determination. If it is determined that the ticket may be properly activated, the host confirms, as at step 414. The host can then activate the ticket by entering the key code link (e.g., external VIRN) from the activation code into the key code algorithm, converting the key code link into a converted code, and comparing the converted code with the stored key code (e.g., internal VIRN) in the records stored in the host's private file. Upon noting a match with one of the tickets in the host's stored records, the host activates the associated ticket for the next drawing, and then sends confirmation of this activation to the appropriate device, such as the retailer terminal or other device used by the player, as at step 416.

Game drawings can be conducted according to the game involved. For example, for the game associated with the ticket in FIGS. 2 and 3, a drawing occurs in which a single digit (e.g., the number "1") is drawn from a collection of digits (e.g., the numbers 1 through 9). A previously defined prize table is consulted to determine whether and how many of the draw-based game indicia (234 in FIGS. 2 and 3) match the drawn number. With specific reference to FIG. 3, the number "1" appears six times among the draw-based game indicia 234. If, for example, the prize table presents a prize for matching three or more indicia with the drawn digit, the draw-based portion 230 of ticket 200 in FIG. 3 would be a winner.

Figure 5:
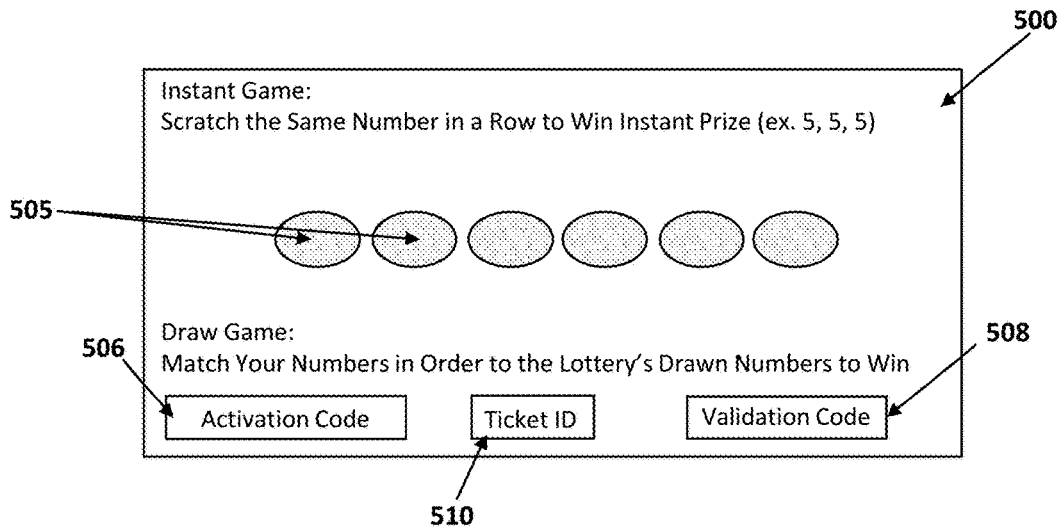
FIGS. 5 and 6 illustrate an exemplary ticket according to certain embodiments of the present disclosure.
Figure 6:
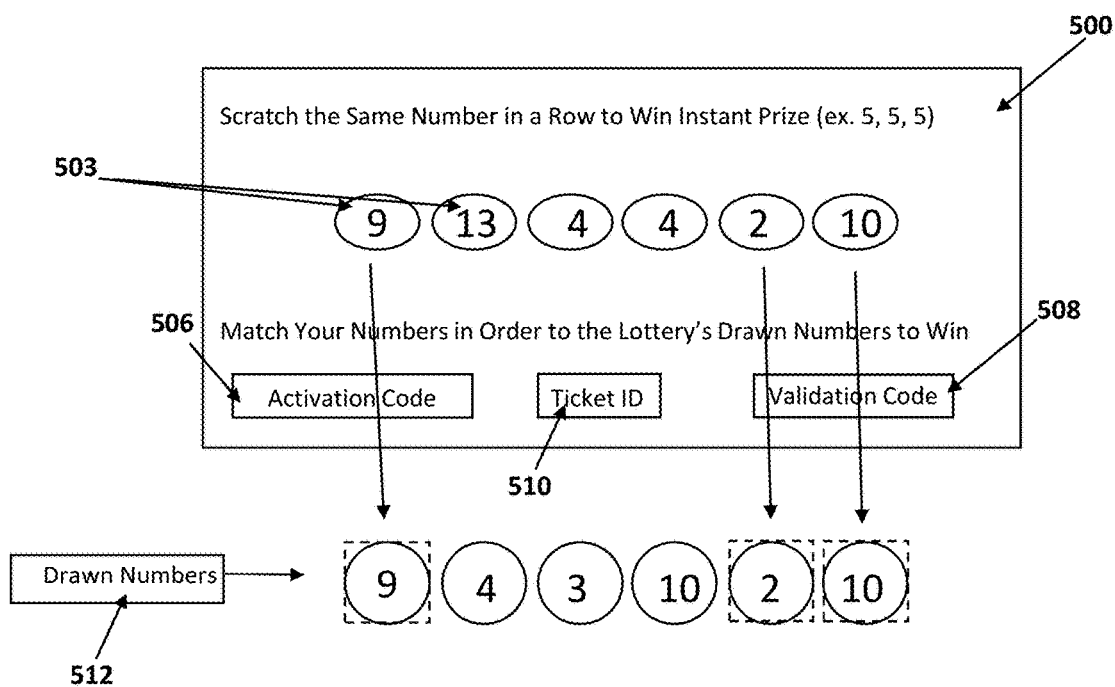

FIGS. 5 and 6 show another exemplary hybrid ticket game, including an instant ticket game and a draw-based game having the same game indicia. As shown therein, ticket 500 includes game indicia 503 under a removable coating 505, along with an activation code 506, a validation code 508 and a ticket identifier 510. The instant game in the embodiment shown in FIGS. 5 and 6 can be won depending upon the number of common indicia in a row within the game indicia. For example, the ticket has two "4" digits in sequence among the six digits in the game indicia, as shown in FIG. 6. Depending upon the prize structure, the player may win based on having two of the same indicia in a row, or may lose if the instant game requires that at least three of the same indicia appear consecutively for the ticket to be a winner. If the ticket is a winner, the validation code is scanned or read and validation proceeds as described elsewhere herein. Separately, the draw-based game portion of the ticket is activated by the scanning or reading of the activation code 506, followed by the activation procedures described elsewhere herein. a drawing is held to generate six single-digit numbers, and the draw results are shown at 512 in FIG. 6. If a subset of the numbers on the ticket appear in the same position as those numbers that are drawn 512, then the ticket can be a winner. As shown in FIG. 6, the ticket has three digits in the game indicia 503 that are the same and in the same order as the drawn numbers 512. Accordingly, if the prize structure rewards such an arrangement, the ticket would be a winner, and validation can occur as described elsewhere herein. Rewarding a player based upon the number of identical indicia on the ticket that match the drawn indicia (e.g., three instances of "5" when the number "5" is drawn receive prize X and four instances of "5" receive prize 2X) is an example of a game having a variable expected return to the player as a function of the prize amount. A variable expected return to the player can also be provided as a function of the odds of winning. In either respect, the existence of a variable expected return to the player heightens the need for security such as described herein, as an unscrupulous individual may try to learn what indicia are printed on unsold tickets to evaluate which tickets are more valuable prior to purchasing the tickets. For example, if a viewable ticket shows four of the same indicia, and the game rewards multiple instances of the same indicia, an unscrupulous individual may attempt to acquire that specific ticket for its potentially large reward. Such an individual may further attempt to acquire that specific ticket if covered indicia on the ticket may be learned through the use of codes as described elsewhere herein.

In various embodiments, tickets can be provided with a multiplier number under a removable covering, and the multiplier number can entitle any winner of the instant and/or drawing-based portions of the ticket game to multiply winnings by the multiplier number. In such embodiments, the multiplier number may be included in the generated record for the tickets having a multiplier, and may further be included in the private file.

With further reference to FIG. 4, when a draw-based game ticket is presented for redemption, the validation code on the ticket is read by the retailer terminal 101, and communicated to the lottery host as at step 418. Presumably, the removable material atop the validation code has not yet been removed by the player, and the retailer can scratch off the removable material to expose the validation code. As the validation code includes the key code link (e.g., external VIRN) and a validation PIN code, the host then runs the key code algorithm to convert the key code link to a converted code, and compares the converted code with the stored key code (e.g., internal VIRN) in the records stored in the host's private file. The host also compares the validation PIN code from the validation code with the corresponding validation PIN code in the records stored in the host's private file. In addition to comparing the key code and the PIN code from the validation code with its stored records for tickets, the host can ensure that the ticket has been activated for play and not yet redeemed, determine the game play indicia associated with the ticket, and then determine what prize is associated with the game indicia. In various embodiments, once a drawing has occurred, the host determines which ticket records correspond to winning tickets by comparing the drawn indicia to the game indicia in the records for each of the tickets. When a validation code is read, the validation PIN code and/or the key code link from the printed ticket is compared to the same code(s) in each record of winning tickets in order to verify that the presented ticket is a winner and determine the associate prize. As described elsewhere herein, the key code link may first be converted using a key code algorithm to a converted code, and the converted code then compared to the key code in the record for the presented ticket. In various embodiments, the comparison of the converted key code link with the stored key code is sufficient to validate the presented ticket, and no validation PIN code comparison is required. Regardless, should the validation process determine that the validation code is valid and/or authentic, the host 120 communicates with the terminal that the code is approved as at step 420, and the retail clerk and/or self-service terminal can pay any associated winnings to the player.

In various embodiments, even though a ticket pack may be activated, the individual drawing tickets in the pack may not be activated. Thus, the holder of a ticket, purchased or not, that has not been activated cannot redeem the ticket for any prize that may have been won, even if the ticket is part of a pack that has been activated for sale. As disclosed, the integrity of wagering game events is controlled according to the present disclosure, in part, by requiring individual ticket activation in addition to ticket pack activation.

In various embodiments, for example, sale of an individual game ticket (e.g. game tickets 200 and 500 in FIGS. 2-3 and 5-6, respectively) is required before the ticket can be made eligible, for example, for a particular wagering event such as a drawing to be held at a later time (e.g., the evening of the day of sale). Upon the draw-based game ticket being activated as described above, the draw-based game ticket becomes "active" and/or registered for the next game event. Such activation and assigned drawing/draw date is also stored in the lottery host's database of ticket information and associated with the activated ticket. In some embodiments, a receipt is issued to the purchaser, or a visual display is presented on a device, indicating the associated game event details.

In some embodiments, there may be instances where a gaming ticket is sold by a retailer to a consumer but the ticket is not, for whatever reason, properly activated. In such scenarios, it may be possible for a consumer to purchase a ticket that is not initially activated properly, risking the result that the ticket sold is outside of the pool of tickets considered for an upcoming wagering event (e.g., a drawing). In various embodiments, the host can activate draw-based game tickets for entry in the draw-based lottery game prior to the drawing without receiving any additional activation signal associated with the scanning of the activation barcode from the tickets to be activated. This can be performed, for example, when the underlying game has been terminated, and there are still unactivated tickets that have been purchased.

Referring back to FIG. 4, at the end of the game for a given set of tickets, the lottery can send an end-of-game notice to retailers as at step 428, whereupon the retailers send back all unsold tickets to the lottery service provider as at step 430. The retailers can be refunded for any tickets which have previously been purchased. The lottery host can obtain the game-pack-ticket numbers from the returned tickets, and present a file or list of the returned tickets and any undistributed tickets to the ticket generator system, as at step 432. The ticket generator system then looks up the key codes (e.g., internal VIRNs) associated with the returned tickets, and sends a list or file of these key codes back to the host, as at step 434. In this way, the service provider and/or printer know that there is no outstanding liability associated with the unsold tickets. However, there may be sold tickets that have not yet been played. As such, the host then checks the VIRNs of the unsold tickets, and searches its records of distributed tickets for any tickets that have NOT been previously activated and that have NOT been returned as unsold. Once the host determines such tickets, the host activates those tickets for the final drawing to be held as part of the end-of-game notice, as at step 436. The final drawing is held, any winning tickets are presented for validation as at step 438 and subsequently validated as at step 440, according to the methods as described elsewhere herein.

Figure 7:
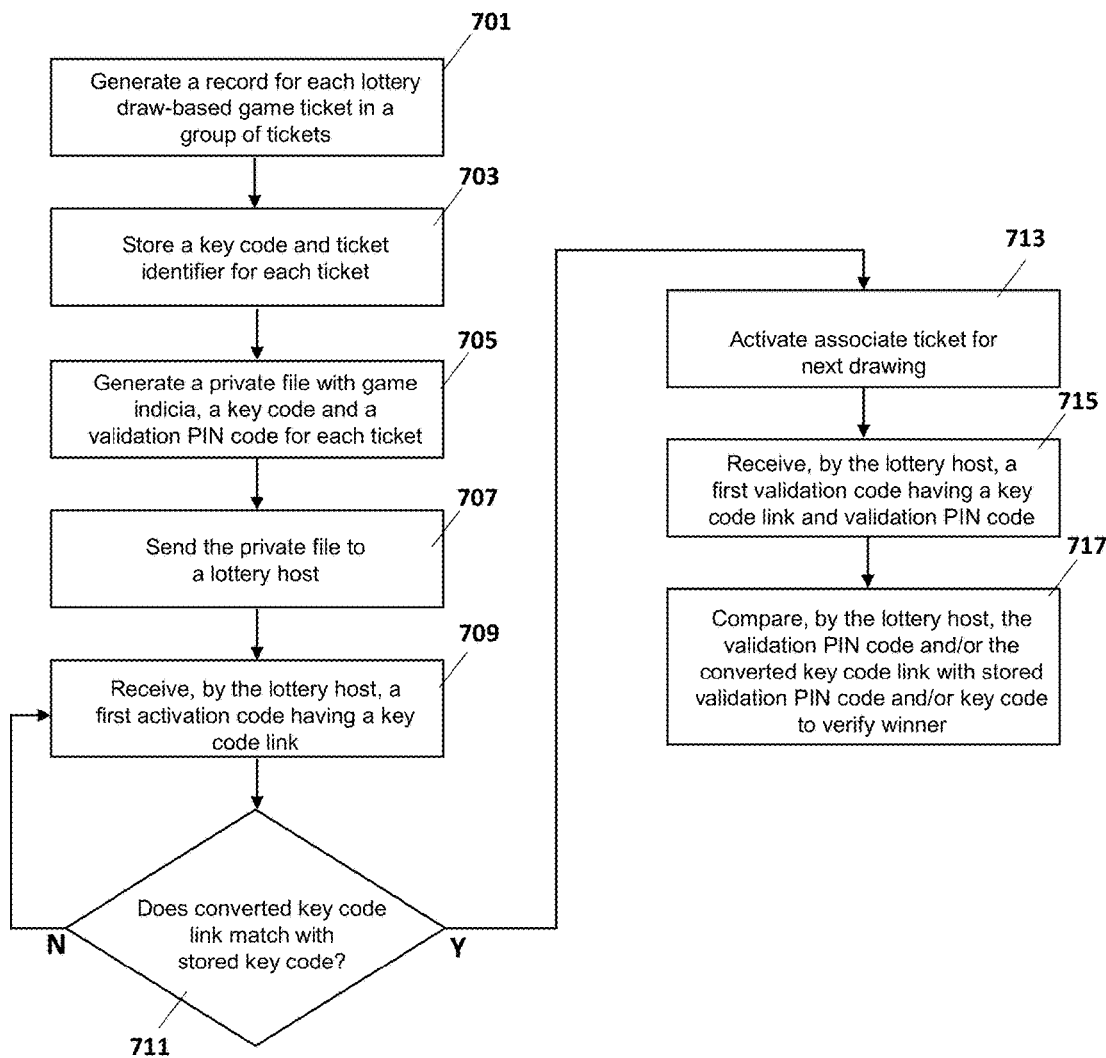
FIG. 7 is a flow diagram illustrating process steps in accordance with embodiments of the present disclosure.

FIG. 7 illustrates another process flow in accordance with embodiments of the present disclosure. As shown therein, at step 701, a record is generated for each of a plurality of lottery tickets. As described above, this record can be generated by the ticket generator component and can include a ticket identifier, game indicia, a key code and a validation PIN code. As at step 703, the ticket identifier and key code are stored, such as by ticket generator as described above. At step 705, a private file is generated, where the private file can include portions of all of the records generated in step 701, wherein the portions include the key code, game indicia and validation PIN code. At step 707, the private file is sent to the lottery host, and at step 709, the lottery host receives an activation signal including, or in the form of, a first activation code that has been read from one of the draw-based game tickets. At step 711, the host can compare a key code link represented by the first activation code with key codes stored in the ticket records of the private file. If a match is found, the associated ticket is activated for the next drawing as at step 713. If no match is found, no tickets are activated and the process returns to step 709 to await another activation signal. As part of step 711, the host can execute the key code algorithm to convert the key code link read from the ticket to a converted code for comparison with a stored key code. After the ticket is activated and a drawing is held to produce drawn indicia, and at step 715, the lottery host receives a first validation code once the first validation code has been read from the activated lottery ticket. The first validation code has the key code link and validation PIN code. Using one or both of these items, at step 717, the lottery host assesses whether the key code link and/or validation PIN code corresponds to the key code and/or validation PIN code in the ticket records, respectively, to determine and verify winnings associated with the ticket. As part of this process, the host can execute the key code algorithm to convert the key code link read from the validation code on the ticket to a converted code, and then compare the converted code with the key codes stored in the ticket records of the private file. Further, the host may have previously determined a subset of winning tickets from all of the activated tickets by comparing the drawn indicia to the game indicia for each ticket in the ticket records. Alternatively, the host may wait until a ticket is presented for redemption and the validation code is received before assessing whether the game indicia stored in the ticket record corresponding to the received validation PIN code and/or key code link sufficiently matches the drawn indicia in order to be a winning ticket entitled to payment of winnings.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. An apparatus, comprising:
   at least one processor; and
   at least one memory device storing a plurality of instructions which, when executed by the at least one processor, cause the at least one processor to:
   generate a record for each of a plurality of lottery draw-based game tickets, wherein the record reflects game indicia, a key code and a validation PIN code, wherein the game indicia and the validation PIN code of each record are printed, respectively, on each of the plurality of lottery draw-based game tickets;
   receive a first activation signal comprising a first activation code that has been read from a first lottery draw-based game ticket of the plurality of lottery draw-based game tickets, wherein the first activation code comprises a key code link for the first lottery draw-based game ticket;
   execute a key code algorithm for converting the key code link to a first converted code, and compare the first converted code to the key code in the generated record for the first lottery draw-based game ticket;
   upon the converted code matching the key code, activate the first lottery draw-based game ticket for entry in a draw-based lottery game prior to a drawing for the draw-based lottery game;
   receive drawn indicia from the drawing for the draw-based lottery game;
   compare the drawn indicia to the indicia in the record for the first lottery draw-based game ticket;
   receive a first validation code that has been read from the first lottery draw-based game ticket, wherein the first validation code comprises the key code link and the validation PIN code; and
   verify that the first lottery draw-based game ticket is a winner by comparing the validation PIN code from the first validation code with the validation PIN code in the record for the first lottery draw-based game ticket.

2. The apparatus of claim 1, wherein verifying that the first lottery draw-based game ticket is a winner further comprises executing the key code algorithm for converting the key code link from the first validation code to a second converted code, and comparing the second converted code to the key code in the record for the first lottery draw-based game ticket.

3. The apparatus of claim 1, wherein the instructions further cause the at least one processor to generate a record for each of a plurality of instant lottery game tickets, wherein each of the plurality of instant lottery game tickets is physically secured to a respective one of the plurality of lottery draw-based game tickets.

4. The apparatus of claim 3, wherein the game indicia comprises indicia for determining the outcome of the draw-based lottery game and an instant win lottery game.

5. The apparatus of claim 1, wherein, prior to the activating step, the instructions further cause the at least one processor to confirm that the plurality of lottery draw-based game tickets has been activated for sale.

6. The apparatus of claim 1, wherein the instructions further cause the at least one processor to activate at least one additional lottery draw-based game ticket for entry in the draw-based lottery game prior to the drawing for the draw-based lottery game without receiving an additional activation signal indicating that an additional activation code has been read from the at least one additional lottery draw-based game ticket.

7. The apparatus of claim 6, wherein the instructions further cause the at least one processor to receive a plurality of key codes associated with a plurality of unsold tickets of the plurality of lottery draw-based game tickets, and determine that the at least one additional lottery draw-based game ticket has been sold but unactivated.

8. A method, comprising:
   generating, by at least one ticket generator, an electronic record for each of a plurality of lottery draw-based game tickets, wherein the electronic record comprises at least the game indicia, a key code, a validation PIN code and a ticket identifier, and wherein each of the plurality of lottery draw-based game tickets has the game indicia, the ticket identifier, the validation PIN code and a key code link pre-printed thereupon prior to purchase;
   storing, by the at least one ticket generator, the key code and the ticket identifier for each of the plurality of lottery draw-based game tickets;
   generating, by the at least one ticket generator, a private file comprising the game indicia, the key code and the validation PIN code from the electronic records for the plurality of lottery draw-based game tickets;
   transmitting the private file to a lottery host;
   receiving, by the lottery host, a first activation signal comprising a first activation code that has been read from a first lottery draw-based game ticket of the plurality of lottery draw-based game tickets, wherein the first activation code comprises the key code link on the first lottery draw-based game ticket;

executing, by the lottery host, a key code algorithm for converting the key code link to a first converted code, and comparing the first converted code to the key code for the first lottery draw-based game ticket in the private file;

upon the converted code matching the key code, activating, by the lottery host, the first lottery draw-based game ticket for entry in a draw-based lottery game prior to a drawing for the draw-based lottery game;

receiving, by the lottery host, a first validation code that has been read from the first lottery draw-based game ticket, wherein the first validation code comprises the key code link and the validation PIN code; and verifying, by the lottery host, that the first lottery draw-based game ticket is a winner by comparing the validation PIN code and the key code link from the first validation code with the validation PIN code and the key code in the electronic record for the first lottery draw-based game ticket.

9. The method of claim 8, wherein the step of verifying includes comparing drawn indicia from the draw-based lottery game with the game indicia in the electronic record for the first lottery draw-based game ticket.

10. The method of claim 8, wherein a removable coating is provided atop the game indicia, PIN code and key code link on each of the plurality of lottery draw-based game tickets.

11. The method of claim 8, wherein the plurality of lottery draw-based game tickets have a variable expected return to player based upon the game indicia pre-printed thereupon.

12. The method of claim 11, wherein the variable expected return to player is a function of the prize amount available in the draw-based lottery game.

13. The method of claim 11, wherein the variable expected return to player is a function of the odds of winning in the draw-based lottery game.

14. The method of claim 8, wherein the game indicia comprises indicia for determining the outcome of the draw-based lottery game and an instant win lottery game, and wherein the game indicia determines the outcome of both the draw-based lottery game and an instant win lottery game.

15. The method of claim 8, further comprising the steps of receiving, by the lottery host, a plurality of key codes associated with a plurality of unsold tickets of the plurality of lottery draw-based game tickets, determining, by the lottery host, at least one sold but unactivated ticket from the plurality of lottery draw-based game tickets and activating, by the lottery host, the at least one sold but unactivated ticket.

16. The method of claim 15, wherein the plurality of key codes associated with the plurality of unsold tickets of the plurality of lottery draw-based game tickets are received from the at least one ticket generator after the lottery host determines the ticket identifiers associated with the plurality of unsold tickets and transmits the determined ticket identifiers to the at least one ticket generator.

17. A system, comprising:
at least one retailer terminal;
a plurality of lottery tickets, wherein each of the plurality of lottery tickets comprises a unique ticket identifier, a unique key code link and game indicia for participation in a draw-based lottery game, wherein at least the unique key code link and the game indicia are covered by a removable coating, and wherein the game indicia are sufficient to determine the outcome of the draw-based lottery game once compared with drawn indicia for the draw-based lottery game; and a lottery host in networked communication with the at least one retailer terminal, wherein the lottery host comprises at least one host processor, and at least one host memory device which stores a plurality of instructions, which when executed by the at least one host processor, cause the at least one host processor to perform operations comprising:

storing the game indicia and a unique key code in a unique record for each of the plurality of tickets;

receiving a first signal from the at least one retailer terminal and activating the plurality of lottery tickets for sale;

receiving a second signal corresponding to at least the key code link from a first one of the plurality of lottery tickets;

executing a key code algorithm for converting the key code link to a first converted code, and compare the first converted code to the key code;

upon the converted code matching the key code, activate the first lottery draw-based game ticket for entry in a draw-based lottery game prior to a drawing for the draw-based lottery game;

receiving a third signal corresponding to at least the key code link for the first one of the plurality of lottery tickets; and verify that the first one of the plurality of tickets is a winner by comparing the key code link from the third signal with the key code in the unique record for the first one of the plurality of tickets.

18. The system of claim 17, wherein the second signal is not received from the at least one retailer terminal.

19. The system of claim 17, further comprising at least one ticket generator, comprising at least one ticket generator processor, and at least one ticket generator memory device which stores a plurality of instructions, which when executed by the at least one ticket generator processor, cause the at least one ticket generator to perform operations comprising:

storing the unique ticket number and the unique key code link for each of the plurality of lottery tickets;

receiving, from the lottery host, a plurality of ticket identifiers associated with a plurality of unsold tickets; and transmitting, to the lottery host, the key code links associated with the plurality of ticket identifiers associated with the plurality of unsold tickets.

20. The system of claim 19, wherein the lottery host receives from the at least one ticket generator, a plurality of key codes associated with a plurality of unsold tickets of the plurality of lottery draw-based game tickets, wherein the lottery host determines at least one sold but unactivated ticket from the plurality of lottery draw-based game tickets and wherein the lottery host further activates the at least one sold but unactivated ticket.

* * * * *